United States Patent
Kagawa

(10) Patent No.: US 6,222,645 B1
(45) Date of Patent: *Apr. 24, 2001

(54) FACSIMILE APPARATUS AND COMMUNICATION METHOD THEREFOR

(75) Inventor: Tetsuya Kagawa, Ebina (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,460

(22) Filed: Oct. 17, 1997

(30) Foreign Application Priority Data

Oct. 18, 1996 (JP) .................................................... 8-297281

(51) Int. Cl.[7] .................................................... H04N 1/00
(52) U.S. Cl. .......................... 358/434; 358/442; 358/468
(58) Field of Search ................................... 358/434–442, 358/468, 400, 403, 407

(56) References Cited

U.S. PATENT DOCUMENTS

| 4,130,043 | 12/1978 | Niimi ..................................... 84/103 |
| 4,524,668 | 6/1985 | Tomisawa et al. ................... 84/1.24 |

(List continued on next page.)

OTHER PUBLICATIONS

Chaigne et al., *Numerical simulations of piano strings. I. A physical model for a struck string using finite difference methods.*, J. Acoust. Soc. Am. 95(2), Feb. 1994, pp. 1112–1118.

A. Chaigne, *On the use of finite difference for musical synthesis. Application to plucked stringed instruments.*, J. Acoustique 5 (1992) pp. 181–211.

A. Chaigne, *Viscoelastic properties of nylon guitar strings.*, Catgut Acoust. Soc. J. vol. 1, No.7 (Series II) May 1991, pp. 21–43.

P. Cook, *A meta–wind–instrument physical model, and a meta–controller for real time performance control*, Proc. ICMC, San Jose, pp. 273–276, 1992.

Jaffe et al., *Extensions of the karplus–Strong Plucked String Algoritm.*, Computer Music Journal, vol. 7, No. 2, 1983, pp. 56–69.

Karjalainen et al., *Body Modeling Techniques for String Instruments Synthesis*, Proc. ICMC, Hong Kong, pp. 232–239, 1996.

Karplus et al., *Digital Synthesis of Plucked–String and Drum Timbres*, Computer Music Journal, vol. 7, No. 2, 1983, pp. 43–55.

Lambourg et al., *Measurements and Modeling of the Admittance Matrix at the Bridge in Guitars*, SMAC 93, Proceedings.

\* cited by examiner

*Primary Examiner*—Edward Coles
*Assistant Examiner*—Mark Wallerson
(74) *Attorney, Agent, or Firm*—Cooper & Dunham LLP

(57) ABSTRACT

A facsimile apparatus including a modulation system capable of operating in V. 8 and V. 34 mode communication. The apparatus also includes a signal detect device that detects a signal being transmitted or received by the modulation system, and a signal change determining device which determines if the detected transmitted or received signal differs from a preceding detected transmitted or received signal. A timer start device starts a timing device each time the detected transmitted or received signal differs from the preceding detected transmitted or received signal. If a time-out determining device determines that a prescribed period of time has elapsed after the timing device is started, an error record memory device stores a record indicating that the prescribed period of time has elapsed. An error record device can then output the information in the record stored in the error record memory device.

52 Claims, 17 Drawing Sheets

U.S. PATENT DOCUMENTS

| | | | |
|---|---|---|---|
| 4,984,276 | 1/1991 | Smith | 381/63 |
| 5,180,877 | 1/1993 | Kunimoto | 84/624 |
| 5,256,830 | 10/1993 | Takeuchi et al. | 84/625 |
| 5,280,366 * | 1/1994 | Araki | 358/453 |
| 5,448,378 * | 9/1995 | Matsumoto | 358/468 |
| 5,471,007 | 11/1995 | Van Duyne et al. | 84/622 |
| 5,721,731 * | 2/1998 | Yoshida | 370/296 |
| 5,751,441 * | 5/1998 | Morimoto | 358/435 |
| 5,818,603 * | 10/1998 | Motoyama | 358/296 |
| 5,829,815 * | 4/1999 | Yoshida et al. | 379/100.16 |
| 5,847,842 * | 12/1998 | Maeda | 358/434 |

| Signal name | Time-out period |
|---|---|
| CM | 3 sec |
| JM | 8 sec |
| INFO0c | 10 sec |

FIG. 10

| Signal name | Time-out period | Operation After Time-out |
|---|---|---|
| CM | 3 sec | V.21 communication |
| JM | 8 sec | V.21 communication |
| INFO0c | 10 sec | terminate communication |

FIG. 13

| TX | | CM | CJ | INFO0c | B | B | L1 | L2 | | B | S | S | PP | TRN | PPH | ALT | MPh | MPh | E | flag | DCS | flag | .. |
|---|---|---|---|---|---|---|---|---|---|---|---|---|---|---|---|---|---|---|---|---|---|---|---|
| RX | ANSam | JM | | INFO0a | A | A | | | A | INFO0h | | | | | PPH | ALT | MPh | MPh | E | DIS | flag | CFR | .. |

FIG. 15
(Prior Art)

FACSIMILE APPARATUS AND COMMUNICATION METHOD THEREFOR

BACKGROUND

1. Field of the Invention

The present invention relates to a facsimile apparatus including a modulation system capable of operating in accordance with ITU-T Recommendations V. 8 and V. 34 and a communication method therefore, and more particularly relates to a facsimile apparatus and a communication method therefor capable of detecting a communication error occurring in V. 8 or V. 34 mode communication. The present invention further relates to a communication apparatus which includes the above facsimile apparatus and which operates with the above communication method.

2. Description of the Related Art

Various standards are defined for a facsimile apparatus under recommendation by the ITU-T (International Telecommunication Union—Telecommunication Standardization Sector). For example, the ITU-T Series T Recommendation defines terminal equipment and protocols for telematic services. Recommendation T. 4 defines Group 3 facsimile terminals and Recommendation T. 30 defines procedures for document facsimile transmission by Group 3 facsimile terminals over the general switched telephone network. The ITU-T Series V Recommendation for data terminal equipment defines procedures for data communication over the general switched telephone network. Recommendation V. 8 defines procedures for starting sessions of data transmission, Recommendation V. 21 defines a modulation system operating at a data signaling rate of 300 bit/s, and Recommendation V. 34 defines a modulating system operating at data signaling rates of up to 33600 bit/s.

A facsimile apparatus capable of operating in accordance with the ITU-T Recommendation T. 30, previously known as CCITT (The International Telegraph and Telephone Consultative Committee) recommendation, can communicate with any facsimile apparatus which is also operating in accordance with the ITU-T recommendation, even when each communicating apparatus is equipped with different modulation systems.

When a facsimile apparatus incorporating the modulation system defined in Recommendation V. 34 wishes communication with another facsimile apparatus, the apparatus is required to first operate, after the line is connected, in accordance with the start up procedures defined in Recommendation V. 8. Once it is indicated in the V. 8 start up operation that the modulation system defined in Recommendation V. 34 is available both in the transmitting and receiving terminals, then signals for each phase defined in Recommendation V. 34 are exchanged for determining line conditions, modem parameters and so on, so that the communication is carried out at optimum conditions. (Hereinafter, communication or operation in accordance with the procedures defined in Recommendation V. 8 or V. 34 is respectively referred to as V. 8 or V. 34 mode communication or operation.) The V. 34 mode communication is carried out either in the duplex or half-duplex mode using several tone signals and binary signals for different speeds.

FIG. 15 is a diagram showing an example of a typical start up signals sequence of a facsimile apparatus capable of V. 8 and V. 34 mode communication, from V. 8 mode sequences through V. 34 mode sequences, up to the end of facsimile handshaking and prior to starting control channel signals sequences.

In the drawing, TX is a transmitting terminal and RX is a receiving terminal. CM represents a call menu signal which is transmitted by the transmitting terminal to delineate modulation systems available at the transmitting terminal TX, ANSam a modulated answer tone signal which is transmitted by the receiving terminal RX in response to a calling tone from the transmitting terminal TX indicating that the line is connected, JM a joint menu signal which is transmitted by the receiving terminal RX in response to a CM signal to specify modulation systems available at both terminals, A a tone which is transmitted by the responding modem, B a tone which is transmitted by the transmitting modem, CJ a CM terminator signal which indicates detection of a JM signal and termination of a CM signal, and INFO0a and INFO0c respectively represent an example of signal for exchanging information of modem capability, result of line probing and data mode modulation parameter.

Exchanges of signals for the start up procedures in accordance with the V. 8 and V. 34 procedures are very complicated, and generally the communication is automatically carried out between the modulation systems at both sides, a transmitting side and a receiving side. Various modem parameters are determined by the communication between the modulation systems without involving control of the host CPU of the facsimile apparatus in which each modulation system is installed.

However, depending upon conditions of communication line, instances occur where transmitted signals do not reach the destination terminal, which is called hereinafter as a communication error, resulting in wasting of communication time.

FIG. 16 is a diagram illustrating an example of a communication error occurred in V.8 mode communication due to a fault in the line, and FIG. 17 a diagram illustrating an example of a communication error occurred in V. 34 mode communication. FIG. 16 illustrates a state that a joint menu signal JM from a receiving terminal does not reach a transmitting terminal TX in V. 8 mode communication and both terminals TX and RX are in a state to continue transmitting each signal.

FIG. 17 illustrates a state that an INFO0a signal from a receiving terminal does not reach a transmitting terminal TX in V. 34 mode communication and both terminals TX and RX are in a state to continue transmitting each signal.

In V. 8 mode communication, signals for establishing communications between TX and RX, such as CM, JM and CJ signals, are repeatedly transmitted until a valid response is received from the destination terminal. In V. 34 mode communication, certain signals are also repeatedly transmitted.

In addition, in V. 34 mode communication, if a valid response is not received for a predetermined period of time, a recovery sequence is initiated. In this recovery sequence, the communication process is repeated so that several previously transmitted signals that have received valid responses are retransmitted and the signal that did not receive a valid response is also retransmitted.

However, in the V. 8 and V. 34 Recommendations, there is no stipulation for terminating the communication to disconnect the line even if a responding signal as specified is not received within a certain period of time after transmitting a signal or starting the recovery sequence.

For a case that a communication error occurs, the ITU-T Recommendation T. 30 specifies that if a valid responding signal is not received from a destination terminal within a specified period of time, such as, for example, 35 sec, after transmitting a signal, the terminal may signal to the operator or disconnect the line.

A period of time waiting for receiving a response signal is called a time-out period and the expiration of a specified time-out period is known as a time-out in the Recommendation T. 30.

A facsimile apparatus is generally designed to disconnect the line if a time-out occurs in accordance with the T. 30 procedures. A facsimile apparatus including the modulation system capable of operating in accordance with the V. 8 and V. 34 Recommendations generally continues the V. 8 or V. 34 mode communication until a time-out occurs in accordance with the procedures defined in the Recommendation T. 30.

One drawback to repeatedly transmitting certain communication signals when communication cannot be established with a destination terminal is that a relatively long time may be spent before succeeding in the transmission or reception of a signal or before a time-out occurs in accordance with the procedures defined in the Recommendation T. 30. As a result, communication time is wasted, usually without an operator knowing it.

SUMMARY

The present application provides a facsimile apparatus and communication method capable of detecting a communication error occurring in V.8 or V.34 mode communication and changing the operational mode of the apparatus when the error is detected. More particularly, upon detecting the occurrence of a communication error, the apparatus stores a record of the error in a memory and either terminates communication by disconnecting the line or switches communication modes.

As a result, the wasting of communication time is minimized by terminating communication or switching communication modes, and/or a time for the apparatus to resume communication can be shortened since the communication error can be easily identified by referring to the printed error record.

One embodiment of the facsimile apparatus according to the present application includes a modulation system capable of operating in V.8 and V.34 mode communications. A signal detect device detects a signal being transmitted or received by the modulation system, and a signal change determining device determines if the detected transmitted or received signal differs from a preceding detected transmitted or received signal. A timer start device starts a timing device each time the signal change determining device determines that the detected transmitted or received signal differs from the preceding detected transmitted or received signal. If a time-out determining device determines that a prescribed period of time (time-out period) has elapsed after the timing device is started, an error record memory device stores a record indicating that the prescribed period of time has elapsed (i.e., a record indicating that a communication error has occurred). If a communication error occurs, the apparatus can terminate communication or switch communication modes. The apparatus further includes an error record output device for outputting the information in the record stored in the error record memory device.

The facsimile apparatus may also include a time-out information storage device that stores information of a time-out period for each signal defined by V.8 or V.34 mode communication. Each time a signal defined by V.8 or V.34 mode communication is detected, the corresponding time-out period stored in the time-out information storage device for the detected signal is selected, and the time-out determining device determines if the selected time-out period has elapsed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 10 is a chart representing exemplary time-out information stored in the time-out information storage device of FIG. 9;

FIG. 13 is a chart representing exemplary time-out information stored in the time-out information memory similar to FIG. 10 and illustrating the operation of the apparatus if a communication error occurs;

FIG. 15 is a diagram showing an example of a typical start up sequence of a facsimile apparatus capable of operating in accordance with Recommendations V.8 and V.34;

DETAILED DESCRIPTION

Figure 1:
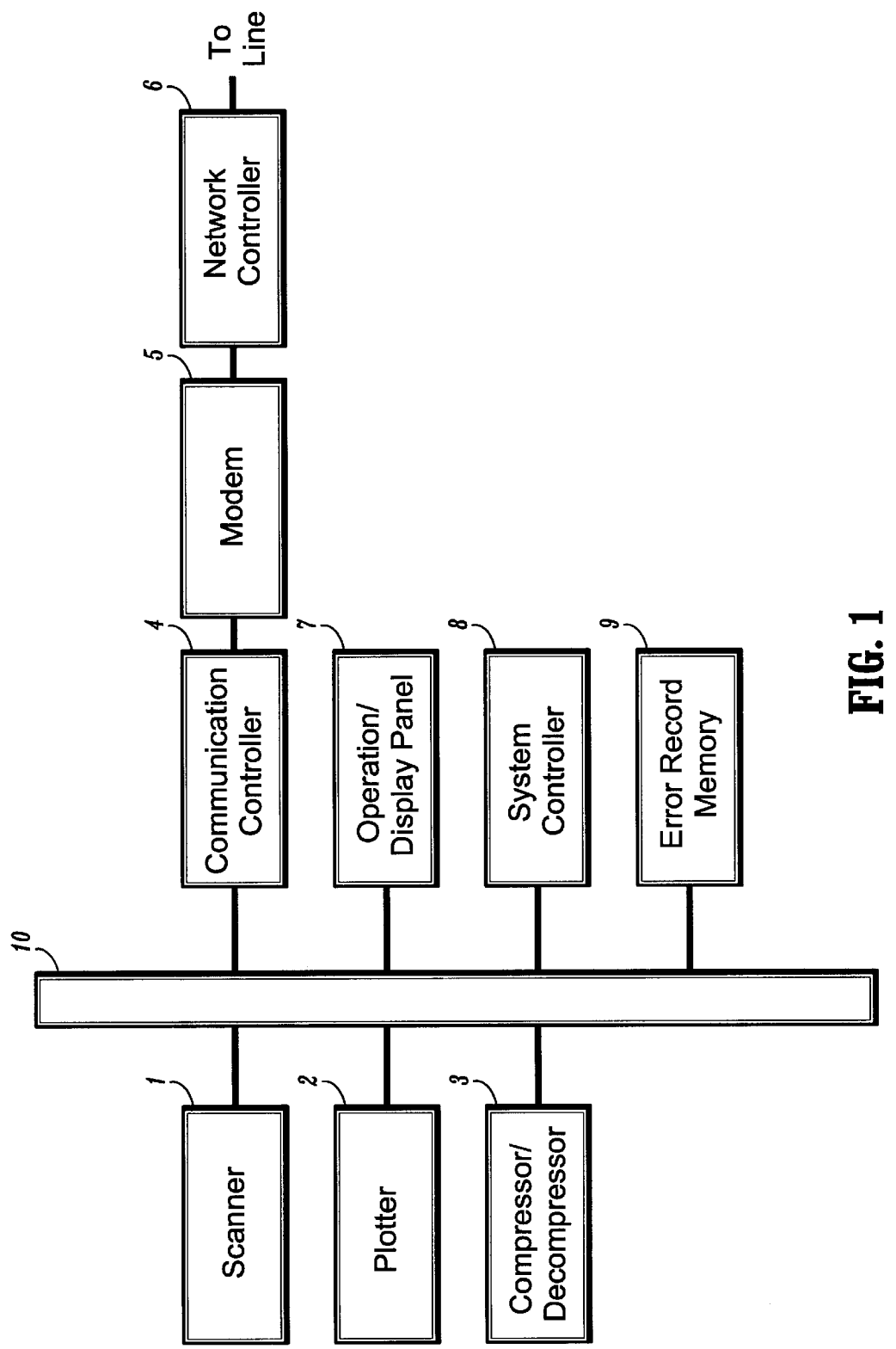
FIG. 1 is a block diagram illustrating an example of the main part of a facsimile apparatus according to the present application.

Referring now to the drawings, wherein like reference numerals designate identical or corresponding parts throughout the several views and embodiments of the present application are explained hereinbelow.

The first embodiment of the present application includes a feature to detect a communication error occurring when a facsimile apparatus is operating in V. 8 or V. 34 mode communication. The embodiment further includes a feature to store a record of the error in a memory and terminate communication by disconnecting the line, so that a reduction in communication time waste is achieved. In addition, a print out of the error record can be made so that the cause of the communication error can be easily identified, and the time to restore communication is reduced.

FIG. 1 is a block diagram illustrating an example of the main part of a facsimile apparatus according to the present application. The facsimile apparatus includes a scanner 1, a plotter 2, a compress/decompress device 3, a communication controller 4, a modem 5, a network controller 6, an operation display/panel 7, a system controller 8, an error record memory 9 and a system bus 10. The scanner 1 includes an image reading device, such as a CCD or a sensor, which reads and converts an image into a machine readable format for transmission to a destination facsimile apparatus or for copying the image onto a recording medium using the plotter 2. The plotter 2 also prints image data received from other facsimile apparatus and various kinds of administrative reports on a recording medium. In accordance with the embodiments of the present application, the plotter 2 also provides printed error reports of detected communication errors that are stored in the error record memory 9.

The compress/decompress device 3 compresses image data for transmission and decompresses received image data to original image data for subsequent printing. The compression and decompression of image data can be achieved using a MH/MR/MMR method.

The communication controller 4 controls a prescribed facsimile communication protocol (e.g., T.30 communication protocol) and includes a signal detect device that detects the existence of a signal being transmitted or received by the modem 5 in V.8 or V.34 mode communication. The signal detect device may be implemented by configuring the communication controller 4 in a similar manner as implemented for monitoring existence of signals in a standard facsimile apparatus.

The modem 5 modulates or demodulates signals, such as image data signals and communication protocol signals, for transmission or reception respectively. The modem 5 includes a modulation system capable of operating at least in V.8 and V.34 mode communication. A telephone line is connected to the network controller 6 which controls the line when detecting an incoming call or making an outgoing call.

The operation/display panel 7 is provided as an operator interface with the facsimile apparatus. For example, the panel may include an LCD or LED display for displaying operating conditions of the apparatus, and function keys that permit the operator to actuate various operations. The operation/display panel 7 functions as an alternative device to output errors recorded in the error record memory 9 by, for example, displaying the error information on the display.

The error record memory 9 stores an error record indicating that a prescribed time-out period has elapsed, which indicates that a communication error has occurred in the V.8 or V.34 mode communication.

Figure 2:
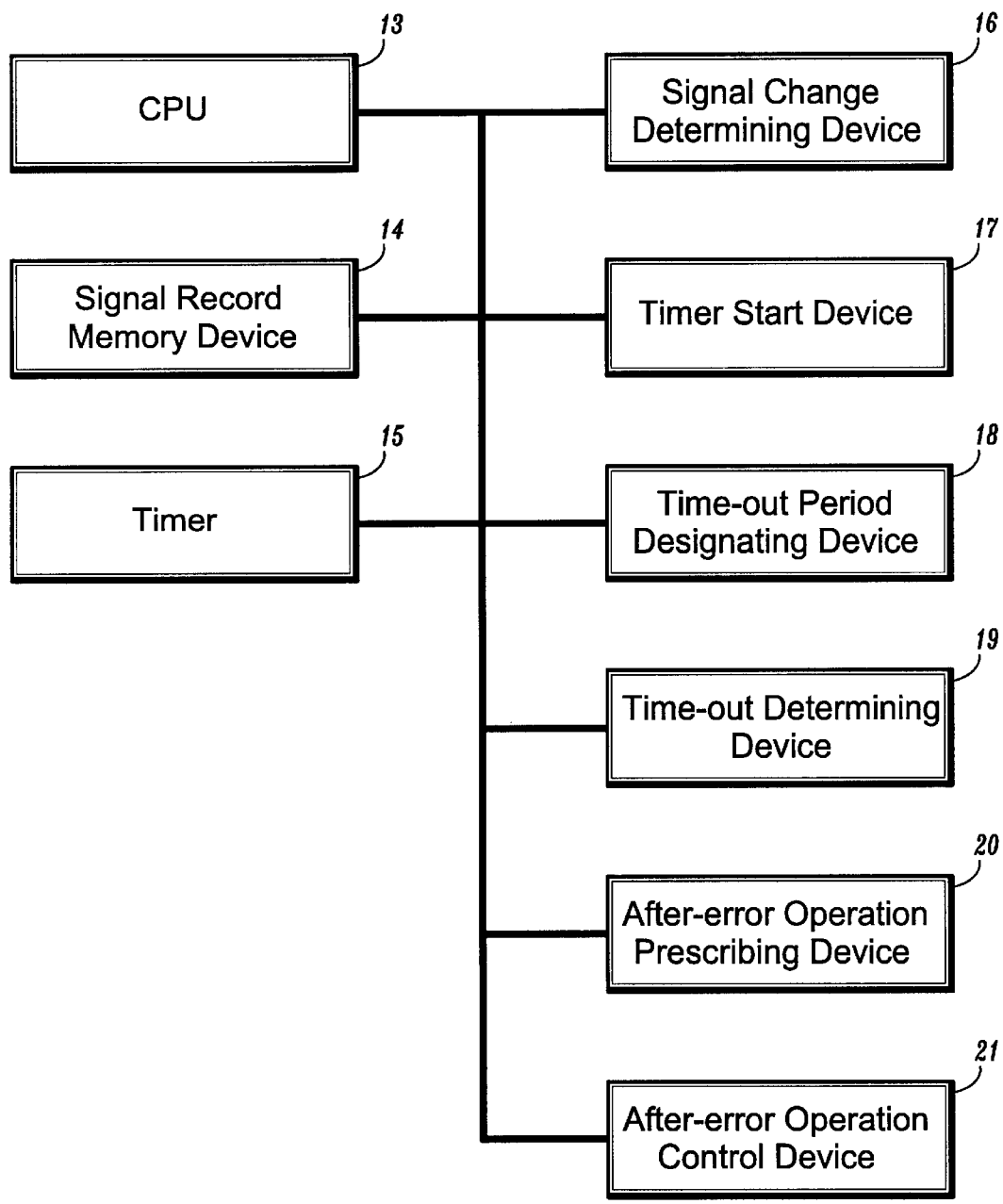
FIG. 2 a functional block diagram illustrating an example of a system controller of the apparatus according to the present application.

Referring now to FIG. 2, the system controller 8 (seen in FIG. 1) includes a CPU 13, a signal record memory device 14 which stores, for example, a record of a detected transmitted or received signal, and a timer 15 which provides system timing. A signal change determining device 16 determines if a detected transmitted or received signal differs from a previously stored detected transmitted or received signal. A timer start device 17 starts the timer 15 each time the signal change determining device 16 determines that the detected transmitted or received signal differs from the preceding detected transmitted or received signal. A time-out period designating device 18 designates a period of time (timeout period) in which the facsimile apparatus waits to receive a response signal, and a time-out determining device 19 determines if the designated time-out period has elapsed. The system controller 8 further includes an after-error operation prescribing device 20 that prescribes the operation the facsimile apparatus after the time-out determining device 19 determines that the time-out period has elapsed. After the time-out period elapses, an after-error operation control device 21 controls the operation of the apparatus as prescribed by the after-error operation prescribing device 20.

Next, the operation of the apparatus when a communication error occurs during communication start up will be explained. As noted, the apparatus of the present application is capable of operating at least in accordance with procedures defined in ITU-T Recommendations V.8 and V.34. Thus, the operation of the facsimile apparatus will be explained for two cases of operation; 1) the case where a communication error occurs in the V.8 communication mode; and 2) the case where a communication error occurs in the V.34 communication mode.

Figure 3:
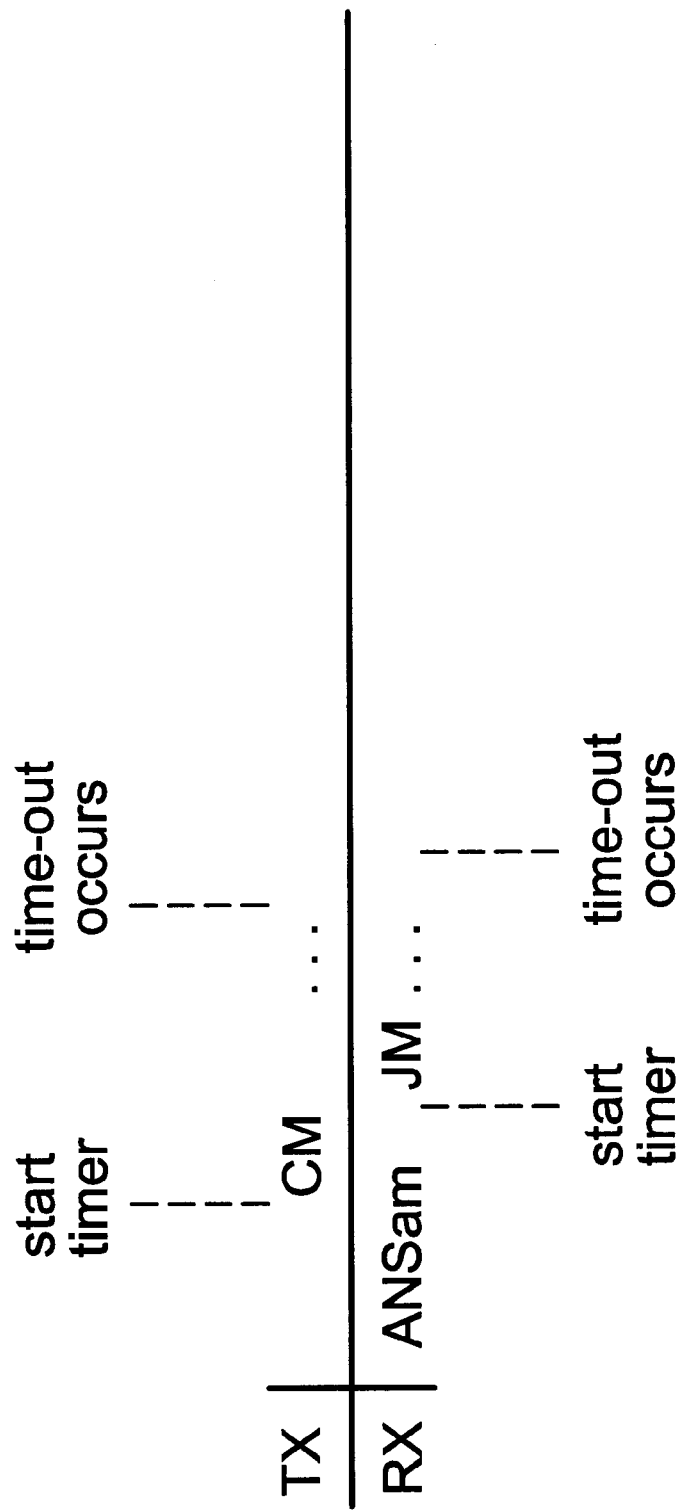
FIG. 3 is a diagram illustrating an example of a timing sequence for determining that a prescribed time-out period has elapsed in V.8 mode communication.

The first case is described with reference to FIG. 3. Initially a transmitting terminal TX starts a timer when a call menu signal CM is transmitted by the transmitting terminal TX. Then, the transmitting terminal TX waits for a response signal from the receiving terminal RX. That is, the transmitting terminal TX waits for a joint menu signal JM from the receiving terminal RX. If, as shown in FIG. 3, the joint menu signal JM is not received by the transmitting terminal TX within the designated time-out period, it is determined as that a communication error has occurred. If the response signal, the JM signal in this case, reaches the transmitting terminal TX within the designated time-out period, the timer of the transmitting terminal TX is reset.

Likewise, the receiving terminal RX starts a timer when the joint menu signal JM is transmitted by the receiving terminal RX. If the JM signal does not reach the transmitting terminal TX so that the transmitting terminal TX continues to transmit the CM signal, a time-out occurs at the transmitting terminal TX because a response to the CM signal is not received within the designated time-out period. Further, the receiving terminal RX will continue to transmit the JM signal because the transmitting terminal TX cannot transmit a CM terminator signal CJ without receiving the JM signal. As a result, a time-out occurs at the receiving terminal RX as well.

Figure 4:
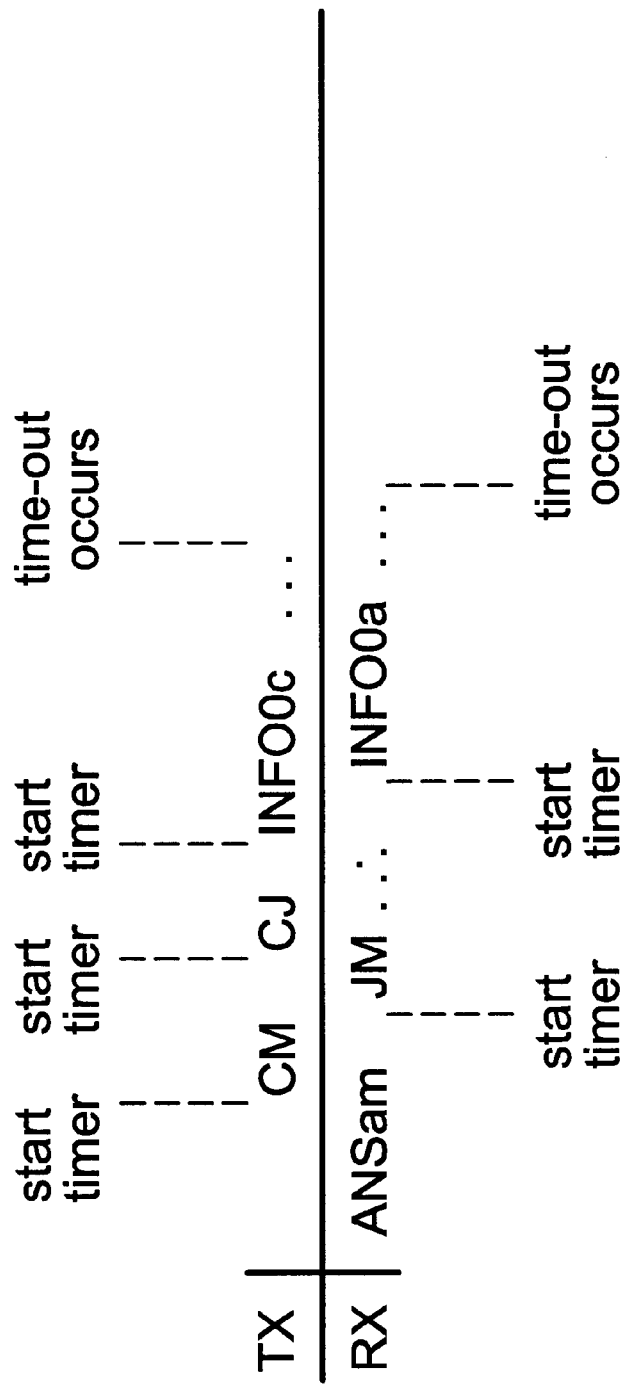
FIG. 4 is a diagram illustrating an example of a timing sequence for determining that a prescribed time-out period has elapsed in V.34 mode communication.

The second case is described with reference to FIG. 4. Similar to the V. 8 mode communication, a timer is started when each start up signal is transmitted by the respective terminal, and when a responding signal is received by a terminal before a time-out occurs the timer is reset. In FIG. 4, a time-out has occurred at the transmitting terminal TX because an INFO0$a$ signal from the receiving terminal has not been received by the transmitting terminal TX. In addition, a time-out has occurred at the receiving terminal RX because an INFO0c signal has not been received by the receiving terminal RX.

In this first embodiment of the present application, when a time-out occurs, a record indicating that the time-out has occurred (hereinafter referred to as an error record) is stored in the error record memory 9. The error record includes information, such as information indicating that a time-out has occurred and information about the signal transmitted from which the time-out is related to. Therefore, if a communication error has occurred, the error can be confirmed by reading information from the error record and displaying the information on the display of the operation/display panel 7, or by printing the information on a recording sheet with the plotter 2.

More specifically, referring to FIGS. 2–4, each time V.8 or V.34 mode communication starts the timer 15 in the system controller 8 is started, and at the same time records of previous transmitted and received signals are cleared from the signal record memory device 14 of the system controller 8. Thereafter, each time a signal is transmitted or received by the modem 5 in accordance with V.8 or V.34 mode communication protocol, the signal is detected by the communication controller 4 (functioning as the signal detect device) and information pertaining to the detected signal is stored as a record in the signal record memory device 14. The signal change determining device 16 then determines if the detected signal differs from a preceding detected transmitted or received signal by comparing the information of the detected signal with the information in the signal record stored in the signal record memory device 14. If it is determined that the detected transmitted or received signal differs from the preceding one, then the record of the preceding detected transmitted or received signal stored in the signal record memory 14 is updated with the information of the newly detected signal.

To illustrate, in the V.8 mode communication, when an ANSam signal transmitted by the receiving terminal RX is received after the previous records of transmitted and received signals stored in the signal record memory device 14 are cleared, the record of the ANSam signal is stored in the signal record memory device 14. When a CM signal is next transmitted, the record of the CM signal is stored in the signal record memory 14. If a JM signal is received and detected by the communication controller 4 the information of the received JM signal is compared with the information in the signal record in the signal record memory 14 by the signal change determining device 16 of the system controller 8. In this illustration, the received signal (i.e., the JM signal) differs from the signal record of the previous signal received (i.e., the ANSam signal). As a result, the record in the signal record memory 14 is updated to reflect the record of the JM signal. Thus, in this embodiment, records of the latest transmitted and received signals are stored in the signal record memory 14.

If, on the other hand, the signal change determining device 16 determines that the transmitted or received signal is the same as the preceding transmitted or received signal, then the time-out determining device 19 makes a determination as to whether the time-out period designated by the time-out period designating device 18 has elapsed. If the time-out determining device 19 determines that the time-out period has elapsed, an error record is stored in the error record memory 9. As noted, the information in the error record can be outputted by displaying the information on the display of the operation/display panel 7, or by printing the information on a recording sheet using the plotter 2.

Referring again to FIG. 2, after the time-out period expires, the after-error operation prescribing device 20 provides termination (or other) instructions to the after-error operation control device 21 which controls the operation of the apparatus to terminate communication by disconnecting the line.

The above-described features of the facsimile apparatus according to the first embodiment of the present application will be now explained with reference to the flowchart shown in FIG. 5. Once communication starts (e.g., after an off-hook occurs at the receiving terminal), step 1 determines if communication is in V.8 or V.34 mode communication. If communication is in either the V.8 or V.34 mode, step 2 clears each previous signal record of previously transmitted and received signals stored in the signal record memory 14, and starts the timer 15.

Step 3 determines if a transmitted or received signal in the V.8 or the V.34 mode communication is detected by the communication controller 4 functioning as the signal detect device. If the answer to the step 3 is yes, the process proceeds to step 4 to determine if the detected transmitted or received signal is the same as the preceding detected transmitted or received signal which is stored in the signal record memory 14. If the answer to the step 4 is no, that is, the detected transmitted or received signal is different from the preceding signal, the record of transmitted or received signal stored in the signal record memory 14 is updated, and at the same time the timer 15 is restarted (step 5). The process then proceeds to step 6. Returning to step 3, if the proper V.8 or V.34 signal is not detected, the process also proceeds to step 6.

In step 6, a determination of whether communication should be terminated is made. If communication is terminated, step 9 then determines if an error record is to be printed on a recording sheet. If the answer to the step 9 is yes, step 10 prints the information in the error record on a recording sheet and then ends the process. If the answer to the step 9 is no, the process proceeds to end. If the communication is not terminated, the process returns to the step 3 to continue the signal detection process.

Returning to step 4, if the detected transmitted or received signal is the same as the previous detected received or transmitted signal, the process proceeds to step 7 to determine if the designated time-out period has elapsed. As noted, this determination is made by comparing the count of the timer 15 with the designated time-out period.

If a time-out has not occurred in step 7, the process returns to the step 3 to continue the signal detection process. If a time-out has occurred in step 7, the process proceeds to step 8 to store in the error record memory 9 an error record indicating that a time-out has occurred, and then proceeds to step 6.

By terminating communication with the receiving terminal upon detecting a communication error, the wasting of communication time is minimized. Further, by recording the error in the error record memory 9 and outputting the information in the error record, the cause of the communication error can be easily identified so that the time for resuming communication can be shortened.

A second embodiment of the facsimile apparatus according to the present application will be described with reference to FIGS. 2 and 6–8. In this embodiment, the structure of the facsimile apparatus and that of the system controller 8 according to this aspect of the application are respectively the same as those of the first embodiment, except that the modem 5 is also capable of operating in accordance with Recommendation V.21 used for standard facsimile apparatus.

As in the first embodiment, there are two cases of errors, one in the V.8 mode communication, and the other in the V.34 mode communication. As noted, if a communication error occurs either in the transmitting terminal TX or in the receiving terminal RX, then both terminals turn into a state to wait for receiving a response signal from the other terminal.

Figure 6:
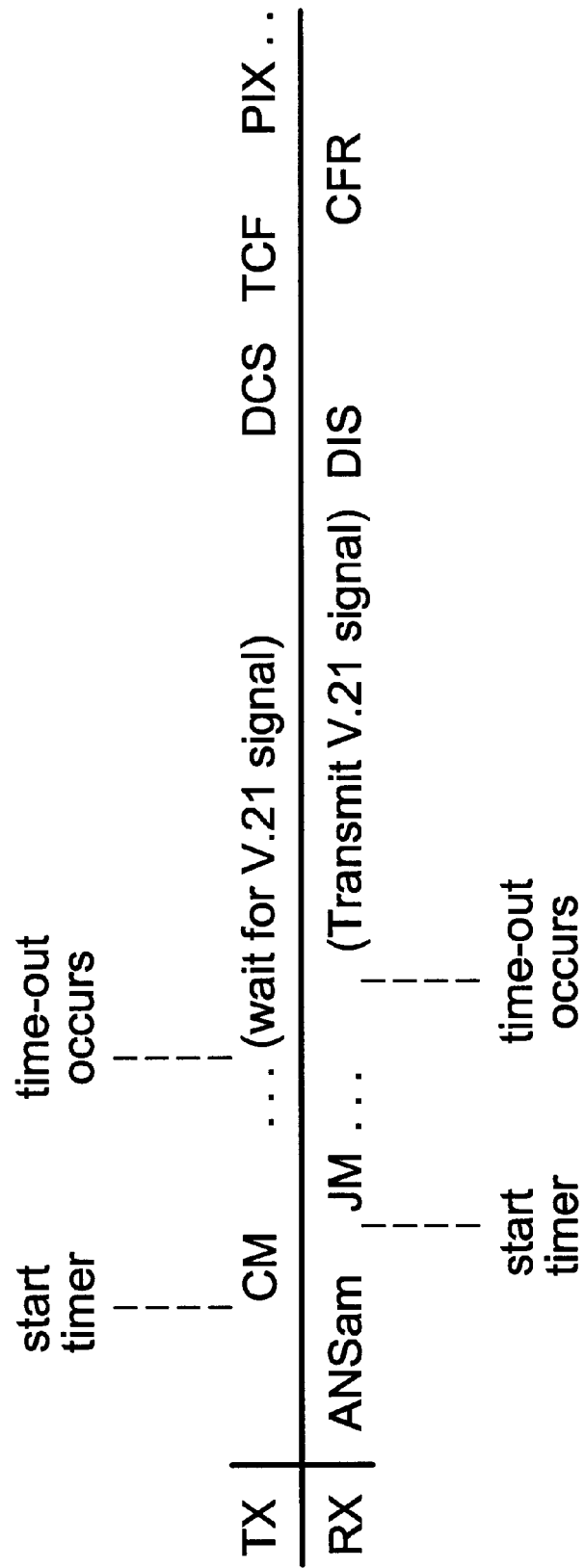
FIG. 6 is a diagram illustrating an example of a timing sequence for switching to a V.21 mode communication when a time-out occurs while the apparatus is operating in the V.8 mode communication.

FIG. 6 provides an example of V.8 mode communication, where the timer is started when the receiving terminal RX transmits a JM signal. If the JM signal does not reach the transmitting terminal TX, no response signal comes from the transmitting terminal TX and therefore a time-out occurs at the receiving terminal RX. Further, because the JM signal does not reach the transmitting terminal TX, the transmitting terminal TX continues to transmit the CM signal and a time-out occurs at the transmitting terminal TX.

In this second embodiment, when a time-out occurs at the transmitting terminal TX after transmitting the CM signal, the transmitting terminal TX terminates V. 8 mode communication and switches to V.21 mode communication at which time the transmitting terminal TX goes into a wait state for receiving a signal in the V.21 mode from the receiving terminal RX.

Similarly, when a time-out occurs at the receiving terminal RX after transmitting the JM signal, the receiving terminal RX switches from V.8 mode communication and to V.21 mode communication and transmits a digital identification signal DIS in accordance with V.21 mode communication.

If the transmitting terminal TX receives a signal, such as the DIS signal, in V.21 mode communication from the receiving terminal RX, then the transmitting terminal TX operates thereafter in accordance with the V.21 mode and the start up sequence is performed in accordance with the standard T.30 procedures.

Thus, once a communication error occurs in V.8 mode communication, both the transmitting and receiving terminals switch to V.21 mode communication and subsequent communication is operated in accordance with standard T.30 procedures.

Figure 7:
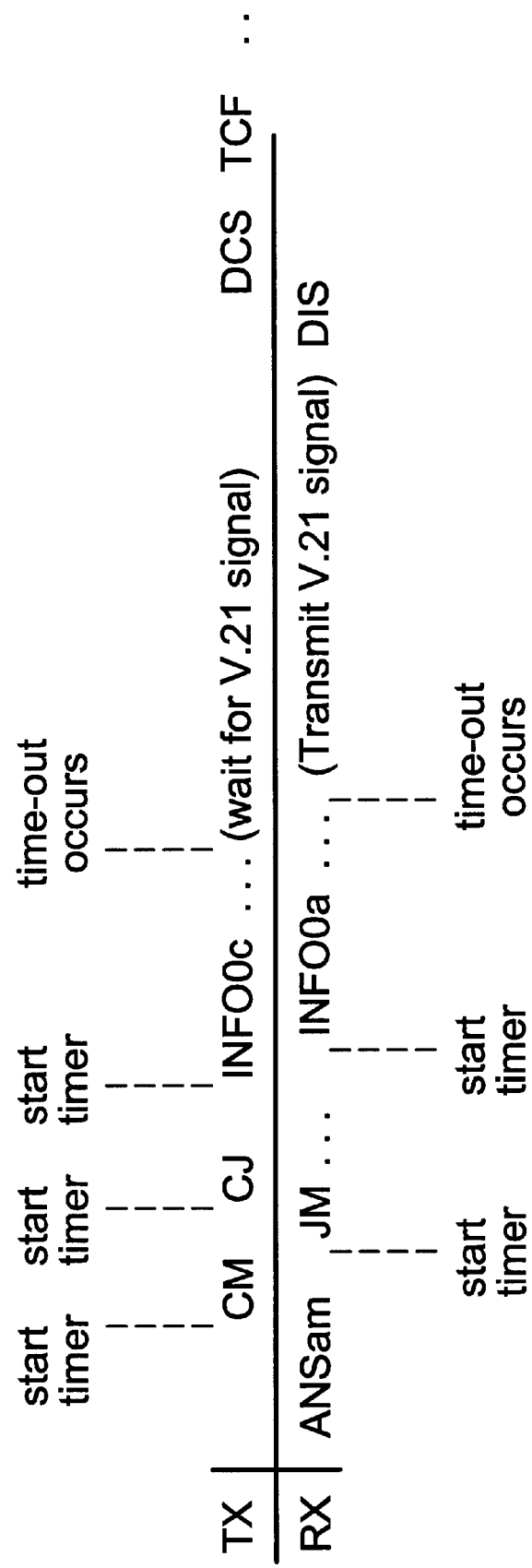
FIG. 7 is a diagram illustrating an example of a timing sequence for switching to the V.21 mode communication when a time-out occurs while the apparatus is operating in the V.34 mode communication.

In V.34 mode communication in the second embodiment, when a time-out occurs after the receiving terminal RX transmits an INFO0a signal, as seen in FIG. 7, V. 34 mode communication is dropped by the receiving terminal which then transmits a DIS signal in accordance with V.21 mode communication. In addition, when a time-out occurs after the transmitting terminal TX transmits an INFO0c signal, V.34 mode communication is dropped by the transmitting terminal TX which then waits to receive a signal in V.21 mode communication. Thereafter, both terminals operate in accordance with standard T.30 procedures.

In this second embodiment, after the time-out period expires, the after-error operation prescribing device 20 provides instructions to the after-error operation control device 21 to control the operation of the apparatus so that operation of the apparatus is switched to V.21 mode communication.

Figure 8:
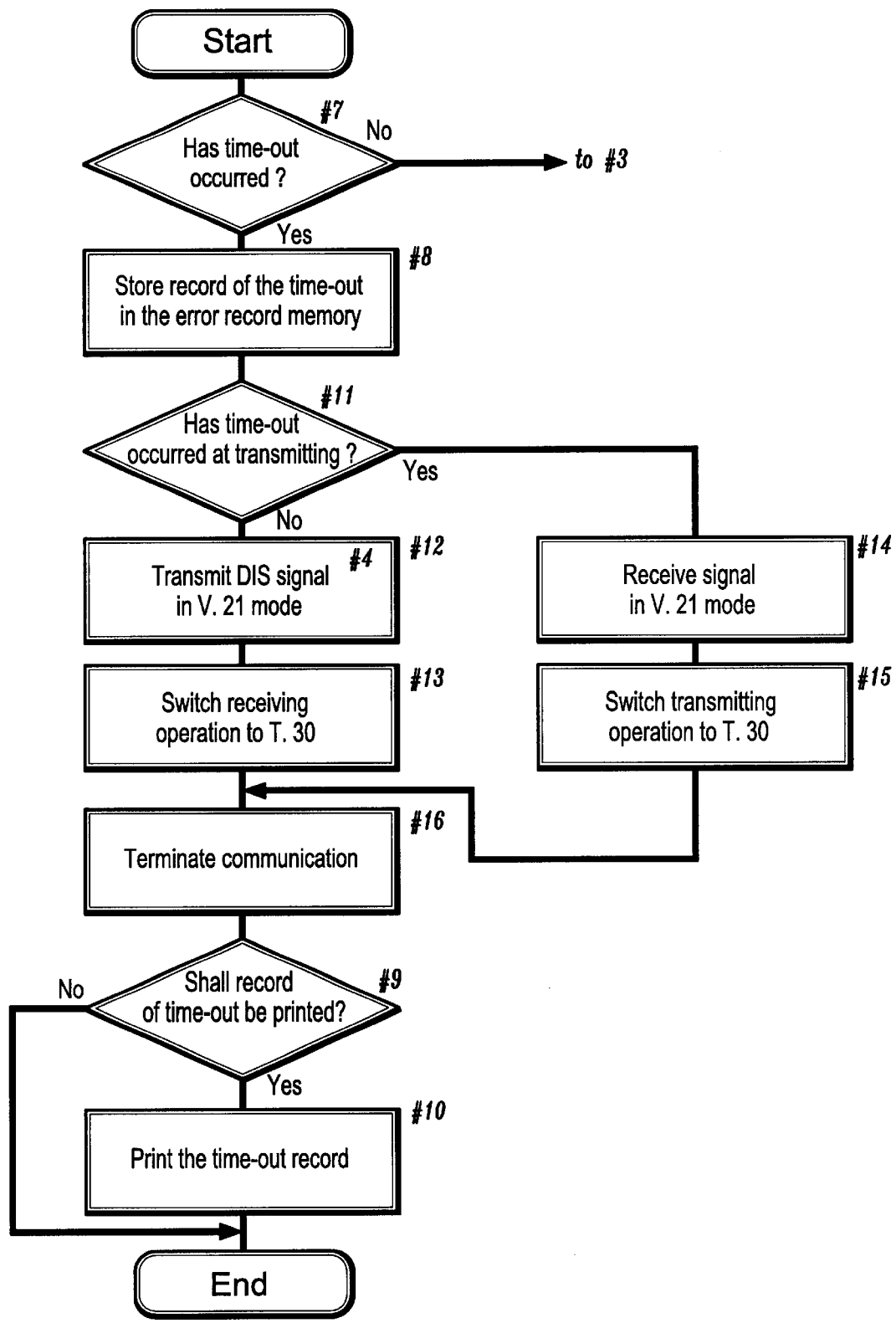
FIG. 8 is a flowchart illustrating an example of the operation of the facsimile apparatus of the present application after a time-out occurs.

Referring now to FIG. 8, a flowchart illustrating the operation of the facsimile apparatus for the above-mentioned second embodiment is shown. In FIG. 8, steps 7–10 are substantially the same as steps 7–10 in FIG. 5, and therefore an explanation of these steps is omitted. Further, the steps prior to step 7 are substantially the same as steps 1–4 in FIG. 5, and therefore illustration is omitted in FIG. 8. Thus, steps 11–16 in FIG. 8 are steps which differ from those in FIG. 5.

Step 11 determines if a time-out (an error) has occurred when transmitting a signal by checking the error record in the error record memory 9. Alternatively, step 11 may determine if the facsimile apparatus is in a state to transmit a signal, or in a wait state to receive a response signal in the same manner as generally implemented in standard facsimile apparatus.

If the answer to the step 11 is no, that is, if the error has occurred at receiving a signal, the process proceeds to step 12 to transmit a DIS signal in accordance with the V.21 mode communication and step 13 switches the receiving operation to the one of the standard T. 30 procedures so that the apparatus operates in accordance with the T. 30 procedures. The process then proceeds to step 16 to terminate communication. If the communication is terminated, the process proceeds to step 9 as in FIG. 5.

If the answer to the step 11 is yes, that is, if the error has occurred when transmitting a signal, the process proceeds to step 14 to switch the operational mode of the apparatus to V.21 mode communication so that the apparatus goes into a wait state to receive the DIS signal in accordance with V.21 mode communication.

Then, in step 15, the operation of the apparatus is changed to standard T.30 procedures to operate thereafter in accordance with T.30 procedures. The process then proceeds to step 16 to terminate communication. If communication is terminated, the process proceeds to the steps 9 and 10 as in FIG. 5. Thus, in the second embodiment, when a communication error occurs while the apparatus is operating in accordance with V.8 or V.34 mode communication, the apparatus is capable of switching the communication mode to, for example, V.21 mode communication. Therefore, waste of communication time is further minimized.

Figure 9:
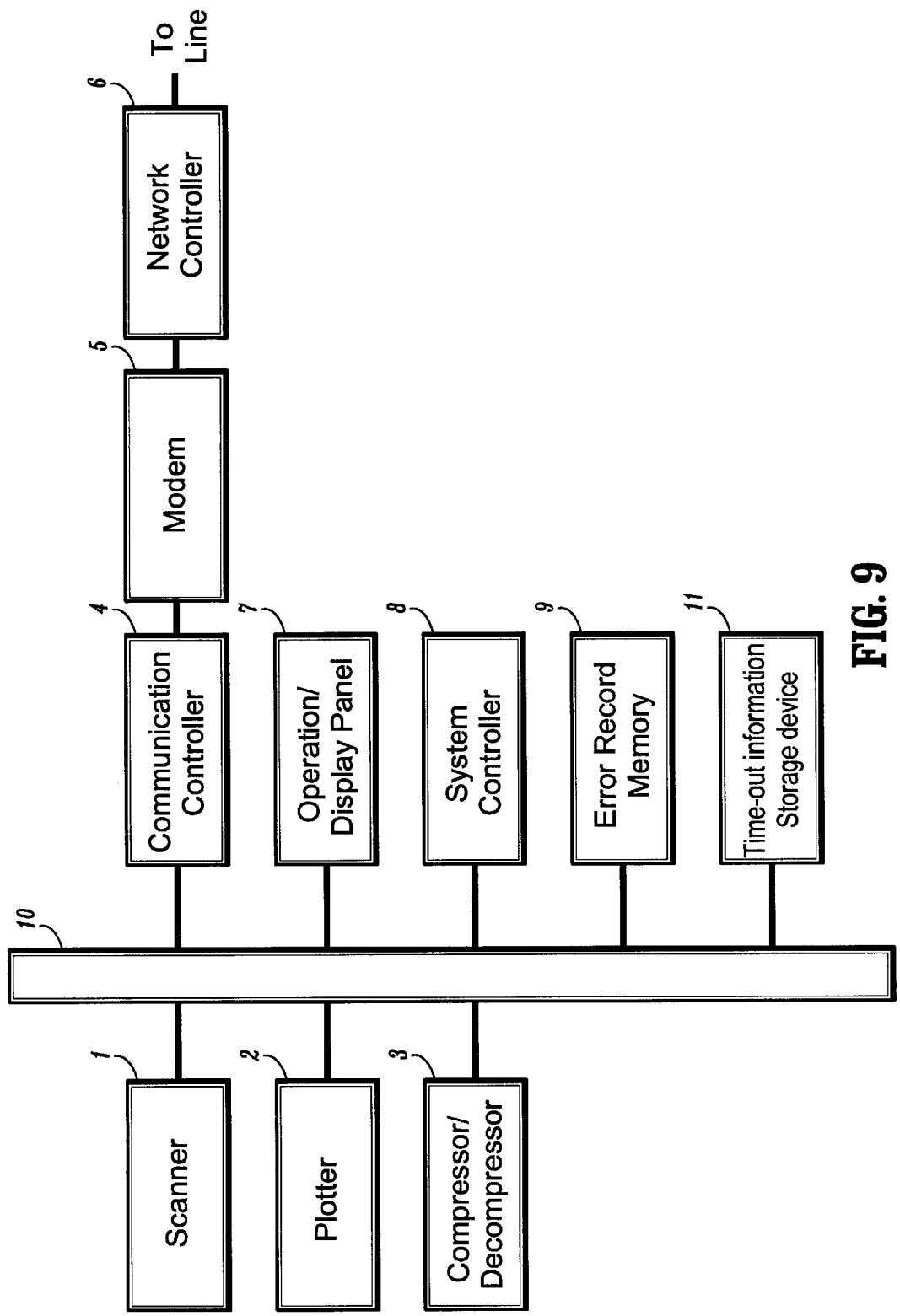
FIG. 9 is a block diagram of an alternative embodiment of the main part of the facsimile apparatus according to the present application that includes memory for storing time-out information.

Next, a third embodiment according to the present application is explained. The third embodiment includes a feature to designate an optimum time-out period for each signal used in V.8 or V.34 mode communication. FIG. 9 is a block diagram illustrating an example of the main part of the facsimile apparatus according to this third embodiment. The construction of the apparatus is substantially the same as the one shown in FIG. 1, except that a time-out information storage device 11 is included. The time-out information storage device 11 stores information of an optimum time-out period for each signal used in V.8 or V.34 mode communication.

Referring to the chart in FIG. 10, for each start up signal used in V.8 or V.34 mode communication, such as CM, JM and INFO0c signals, an optimum time-out period is designated. For example, for the CM signal, the optimum time-out period is designated as 3 sec.

Figure 11:
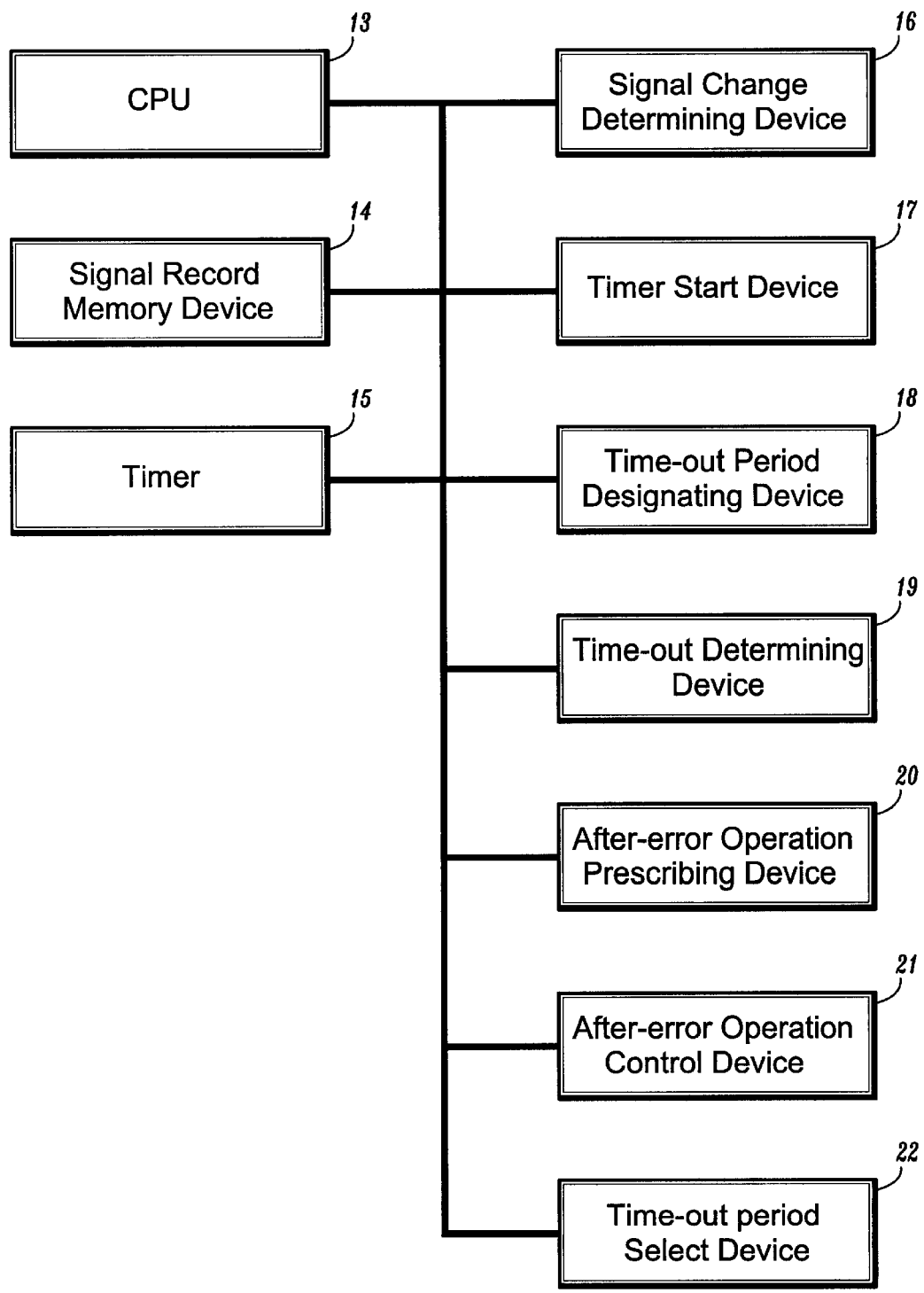
FIG. 11 is a functional block diagram of an alternative embodiment of the system controller of the present application.

FIG. 11 is a functional block diagram illustrating an example of the system controller 8 for the third embodiment. As shown in the drawing, the system controller 8 includes a time-out period select device 22. Each time when a signal is transmitted or received by the modulation system in V.8 or V.34 mode communication and detected by the communication controller 4, the corresponding time-out period for the signal is selected by the time-out period select device 22. The selected time-out period is set with the time-out period designating device 18. Then, the time-out determining device 19 determines if the selected time-out period has elapsed.

Figure 5:
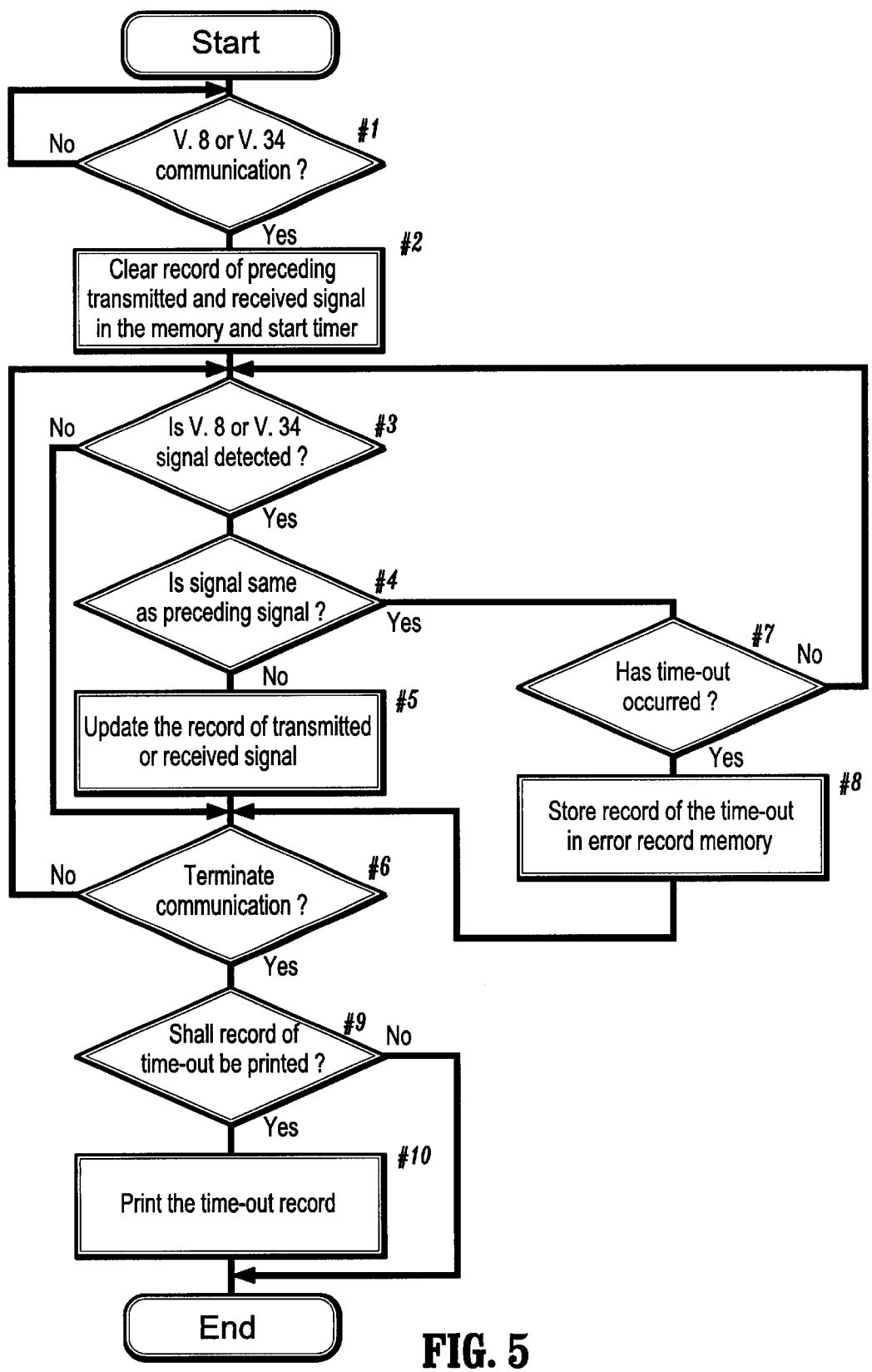
FIG. 5 is a flowchart illustrating an example of the main part of an operation of the facsimile apparatus according to the present application.

The operation flow of this third embodiment is similar to the operation flow shown in FIGS. 5 and 8 (and therefore explanation is omitted) except that, when step 7 determines if time-out has occurred, the time-out period for the detected signal is selected from the information stored in the time-out information storage device 11 and is set with the time-out period designating device 18 by the time-out period select device 22. Thereafter, a determination of whether the selected time-out period has elapsed is made.

Thus, in the third embodiment, an optimum time-out period is designated for each signal used in the V.8 and the V.34 procedures. The optimum time-out period is based on various factors, including signal length (e.g., number of bits per signal) and transmission delay caused by for example line conditions, and results in a reduction of wasted communication time.

A fourth embodiment of the present application includes a feature where the operation to be performed after a communication error occurs is prescribed for each signal of V.8 and V.34 mode communication.

The construction of the apparatus according to the fourth embodiment is substantially the same as the one shown in FIG. 9 for the third embodiment. In this fourth embodiment, information designating the operation to execute after a communication error occurs is stored in the time-out information storage device 11.

Figure 12:
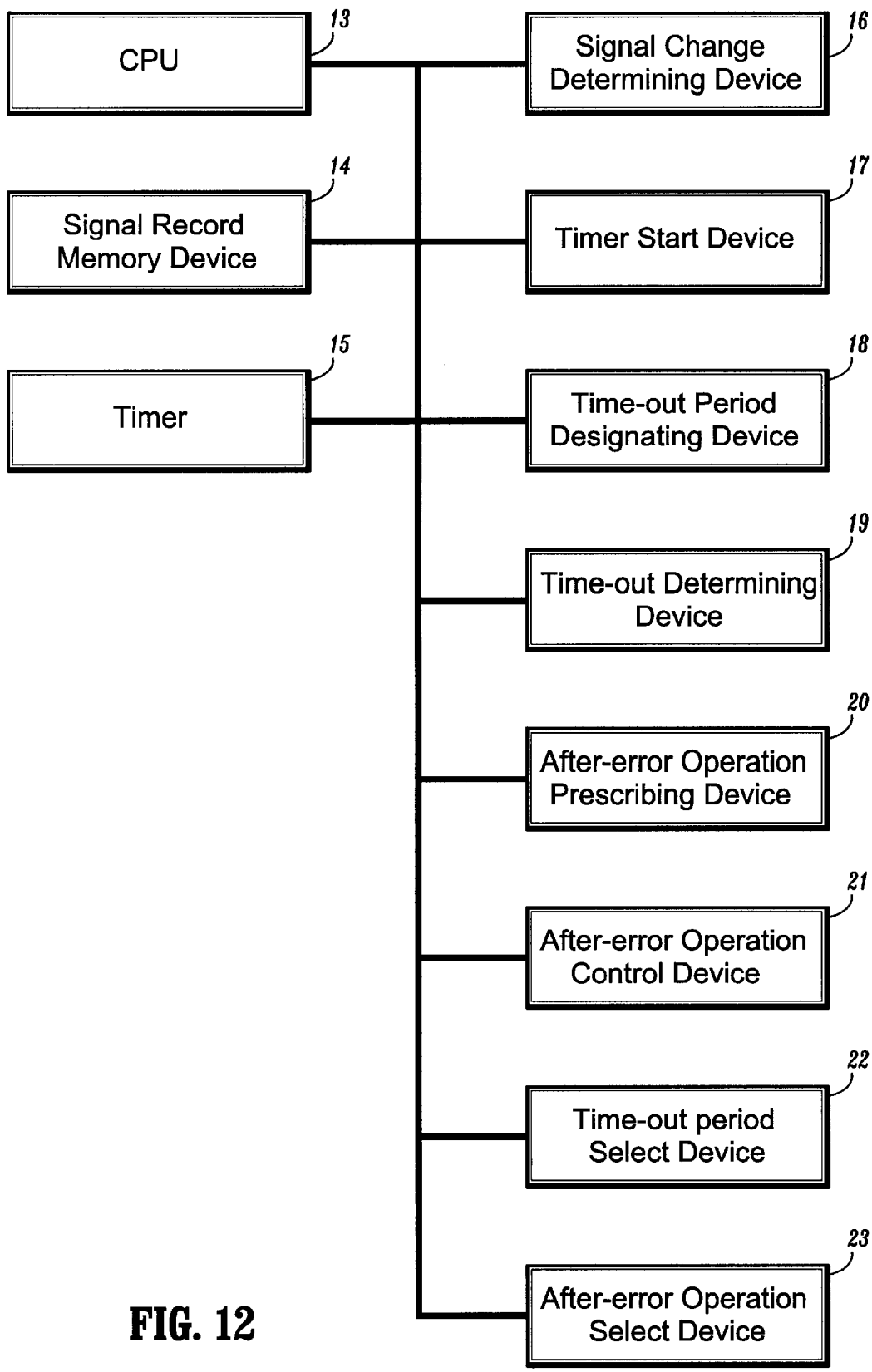
FIG. 12 is a functional block diagram of another alternative embodiment of the system controller of the present application.

FIG. 12 is a block diagram illustrating an example of the system controller 8 for the fourth embodiment. As shown in the drawing, the system controller 8 includes an after-error operation select device 23 which selects the operation the apparatus executes after a communication error occurs. As noted, the operation is selected from the information stored in the time-out information storage device 11.

FIG. 13 is a chart similar to the chart in FIG. 10 and illustrating examples of the operation designating information stored in the time-out information storage device 11. To illustrate, if a communication error occurs when transmitting a CM signal or a JM signal in the V.8 mode communication, the designated operation information designates that the apparatus operates in accordance with the V.21 mode communication after the error occurs and is detected.

On the other hand, if a communication error occurs when transmitting an INFO0c signal in V.34 mode communication, the designated operation information designates that the apparatus terminates communication so that the line is disconnected and the apparatus can attempt a call again.

Figure 14:
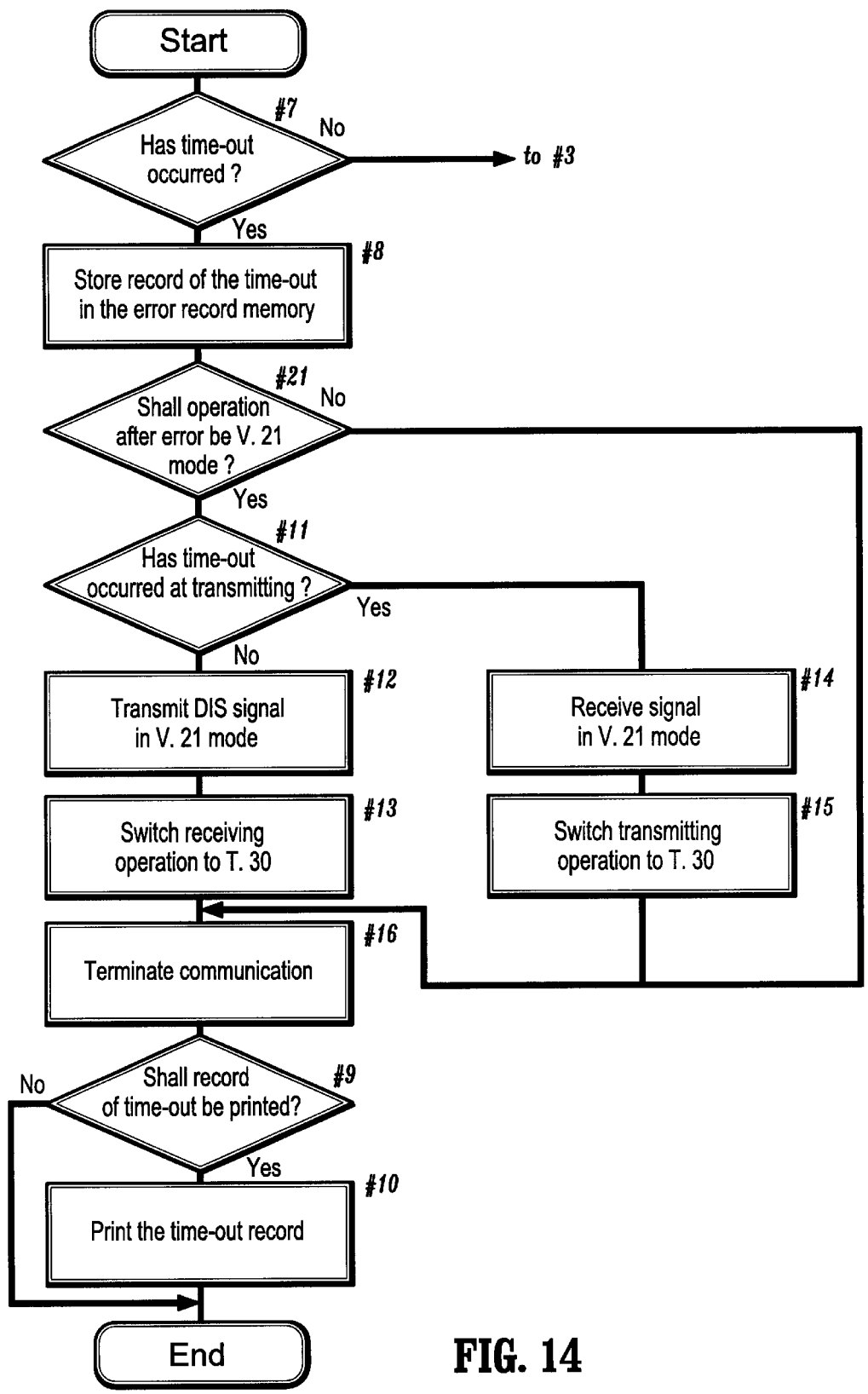
FIG. 14 is a flowchart illustrating another example of the operation of the facsimile apparatus according to the present application after a time-out occurs.
Figure 16:
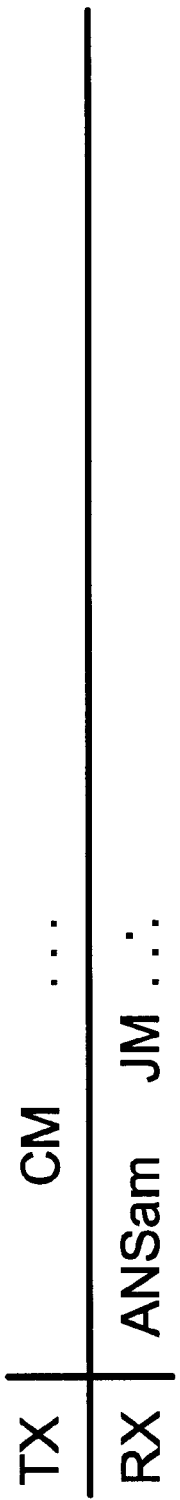
FIG. 16 is a diagram illustrating an example of the start up sequence of FIG. 15 after a communication error occurred in V.8 mode communication.
Figure 17:
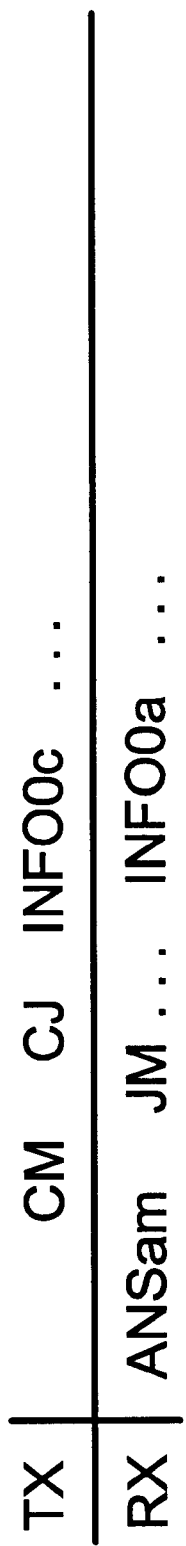
FIG. 17 a diagram illustrating an example of the start up sequence of FIG. 15 after a communication error occurred in V.34 mode communication.

FIG. 14 is a flowchart illustrating an example of the main part of the operation of the facsimile apparatus according to the above-described fourth embodiment. In the drawing, steps 7–10 and steps 11–16 are substantially the same as the steps in FIG. 8 for the second embodiment, and step 21 is added for this fourth embodiment.

The process proceeds in the same manner as in FIG. 8 up to step 8. After step 8 and before proceeding to the step 11, the process proceeds to step 21 to determine if the apparatus is to operate in accordance with the V.21 mode communication after occurrence of a time-out by referring to the information stored in the time-out information storage device 11. If the answer to step 21 is yes, the process proceeds to step 11 to operate in the same manner as in FIG. 8. That is, the terminal switches to V.21 mode communication. If the answer to step 21 is no, the process proceeds to step 16 to terminate the communication by disconnecting the line.

Thus, in the fourth embodiment, the operation executed by the apparatus when a communication error occurs is designated for each signal of V.8 and V.34 mode communications so that a reduction in wasted communication time is achieved.

Numerous additional modifications and variations are possible in light of the above teachings. It is therefore to be understood that within the scope of the appended claims, the present invention may be practiced otherwise than as specifically described herein.

This application is based upon Japanese patent application No. 08-297281 filed in the Japanese Patent Office on Oct. 18, 1996, and the entire contents thereof are incorporated herein by reference.

What is claimed is:

1. A facsimile apparatus, comprising:
    a modulation system capable of operating in a first mode communication;
    signal detecting means for detecting a type of signal being transmitted or received by the modulation system;
    signal record memory means for storing information identifying a preceding type of detected transmitted or received signal;
    signal change determining means for comparing the type of detected transmitted or received signal with the stored information to determine if the type of detected transmitted or received signal differs from the preceding type of detected transmitted or received signal;
    time-out period designating means for designating an optimal time-out period for each type of signal in the first mode communication;
    timer start means for starting a timer each time the signal change determining means determines that the type of detected transmitted or received signal differs from the preceding type of detected transmitted or received signal; and
    time-out determining means for determining if the optimal time-out period elapses after the timer is started.

2. The facsimile apparatus according to claim 1 further comprising error record memory means for storing a record indicating that the time-out period has elapsed.

3. The facsimile apparatus according to claim 2 further comprising error record output means for outputting the record stored in the error record memory means.

4. The facsimile apparatus according to claim 3, wherein the error record output means outputs the record stored in the error record memory means after communication is terminated.

5. The facsimile apparatus according to claim 2, wherein the error record memory means stores information of the detected transmitted or received signal.

6. The facsimile apparatus according to claim 2, wherein the record stored in the error record memory means includes information of the detected transmitted or received signal associated with the error.

7. The facsimile apparatus according to claim 1 further comprising:
    after-error operation prescribing means for prescribing an operational mode of the apparatus after the time-out period has elapsed; and
    after-error operation control means for controlling the operation of the apparatus in accordance with the prescribed operational mode.

8. The facsimile apparatus according to claim 7, wherein the prescribed operational mode terminates communication.

9. The facsimile apparatus according to claim 7, wherein the modulation means is capable of operating in a second mode communication, and wherein the after-error operation prescribing means prescribes an operational mode to switch communication from the first mode communication to the second mode communication.

10. The facsimile apparatus according to claim 9, wherein the first mode communication includes V.8 and V.34 mode communication, and the second mode communication includes V.21 mode communication.

11. The facsimile apparatus according to claim 9, wherein the second mode communication includes V.21 mode communication.

12. The facsimile apparatus according to claim 7 further comprising:
time-out information storage means for storing information representing the operational mode of the apparatus after the time-out period has elapsed for each signal in the first mode communication; and
after-error operation select means for selecting from the time-out information storage means an operational mode for the apparatus after the time-out period elapses.

13. The facsimile apparatus according to claim 12, wherein the after-error operation prescribing means prescribes the selected operational mode.

14. The facsimile apparatus according to claim 12, wherein the information stored in the time-out information storage means includes operational mode information to terminate communication, or to switch communication from the first mode communication to a second mode communication.

15. The facsimile apparatus according to claim 14, wherein the first mode communication includes V.8 and V.34 mode communication, and the second mode communication includes V.21 mode communication.

16. The facsimile apparatus according to claim 14, wherein the second mode communication includes V.21 mode communication.

17. The facsimile apparatus according to claim 1, wherein the signal record memory means updates the information of the preceding detected transmitted or received signal with the information of the detected transmitted or received signal when the detected transmitted or received signal differs from the preceding detected transmitted or received signal.

18. The facsimile apparatus according to claim 1 further comprising:
time-out information storage means for storing a predetermined time-out period to receive a response signal for each signal in the first mode communication; and
time-out period select means responsive to the detection of a transmitted or received signal in the first mode communication, for selecting the time-out period stored in the timeout information storage means, the selected time-out period corresponding to the detected signal.

19. The facsimile apparatus according to claim 18, wherein the time-out designating means designates the selected time-out period.

20. The facsimile apparatus according to claim 1, wherein the first mode communication includes V.8 and V.34 mode communication.

21. A facsimile apparatus comprising:
a modulation system capable of operating in a first mode communication;
a signal detect device which detects a type of signal being transmitted or received by the modulation system;
a signal record memory for storing information identifying a preceding type of detected transmitted or received signal;
a signal change determining device for comparing the type of detected transmitted or received signal with the stored information to determine if the type of detected transmitted or received signal differs from the preceding type of detected transmitted or received signal;
a time-out period designating device which designates an optimal time-out period for each type of signal in the first mode communication;
a timer start device which starts a timer each time the signal change determining device determines that the type of detected transmitted or received signal differs from the preceding type of detected transmitted or received signal; and
a time-out determining device which determines if the optimal time-out period elapses after the timer is started.

22. The facsimile apparatus according to claim 21 further comprising an error record memory device which stores a record indicating that the time-out period has elapsed.

23. The facsimile apparatus according to claim 22 further comprising an error record output device which outputs the record stored in the error record memory device.

24. The facsimile apparatus according to claim 23, wherein the error record output device outputs the record stored in the error record memory device after communication is terminated.

25. The facsimile apparatus according to claim 22, wherein the error record memory device stores information of the detected transmitted or received signal.

26. The facsimile apparatus according to claim 22, wherein the record stored in the error record memory device includes information of the detected transmitted or received signal associated with the error.

27. The facsimile apparatus according to claim 21 further comprising:
an after-error operation prescribing device which prescribes an operational mode of the apparatus after the time-out period has elapsed; and
an after-error operation control device which controls the operation of the apparatus in accordance with the prescribed operational mode.

28. The facsimile apparatus according to claim 27, wherein the prescribed operational mode terminates communication.

29. The facsimile apparatus according to claim 27, wherein the modulation system is capable of operating in a second mode communication, and wherein the after-error operation prescribing device prescribes an operational mode to switch communication from the first mode communication to the second mode communication.

30. The facsimile apparatus according to claim 29, wherein the first mode communication includes V.8 and V.34 mode communication, and the second mode communication includes V.21 mode communication.

31. The facsimile apparatus according to claim 29, wherein the second mode communication includes V.21 mode communication.

32. The facsimile apparatus according to claim 27, further comprising:
a time-out information storage device which stores information of the operational mode of the apparatus after the time-out period has elapsed, for each signal in the first mode communication; and
an after-error operation select device which selects from the time-out information storage device an operational mode for the apparatus after the time-out time has elapsed.

33. The facsimile apparatus according to claim 32, wherein the after-error operation prescribing device prescribes the selected operational mode.

34. The facsimile apparatus according to claim 32, wherein the information stored in the time-out information storage device includes operational mode information to terminate communication, or to switch communication from the first mode communication to the second mode communication.

35. The facsimile apparatus according to claim 34, wherein the first mode communication includes V.8 and V.34 mode communication, and the second mode communication includes V.21 mode communication.

36. The facsimile apparatus according to claim 34, wherein the second mode communication includes V.21 mode communication.

37. The facsimile apparatus according to claim 21, wherein the signal record memory device updates the information of the preceding detected signal with the information of the detected transmitted or received signal when the detected transmitted or received signal differs from the preceding detected transmitted or received signal.

38. The facsimile apparatus according to claim 21 further comprising:
   a time-out information storage device which stores a predetermined time-out period to receive a response signal for each signal in the first mode communication; and
   a time-out period select device responsive to the detection of a transmitted or received signal in the first mode communication, which selects the time-out period stored in the timeout information storage device, the time-out period corresponding to the detected signal.

39. The facsimile apparatus according to claim 38, wherein the time-out designating device designates the selected time-out period.

40. The facsimile apparatus according to claim 21, wherein the first mode communication includes V.8 and V.34 mode communication.

41. A method of communication for a facsimile apparatus, comprising:
   providing a modulation system capable of operating in a first mode communication;
   detecting a type of signal being transmitted or received by the modulation system;
   determining if the type of detected transmitted or received signal differs from a preceding type of detected transmitted or received signal by comparing information of a type of detected received or transmitted signal with information identifying a preceding type of detected transmitted or received signal;
   starting a timing device each time the type of detected transmitted or received signal is different from the preceding type of detected transmitted or received signal; and
   determining if a prescribed period of time, determined to be an optimal time period for each type of signal in the first mode communication, waiting to receive a response signal has elapsed after the timing device has been started.

42. The method of communication for a facsimile apparatus according to claim 41 further comprising storing a record indicating that the prescribed period of time has elapsed in a memory device.

43. The method of communication for a facsimile apparatus according to claim 42 further comprising outputting the record stored in the memory device.

44. The method of communication for a facsimile apparatus according to claim 43, wherein the record stored in the memory device is outputted after communication is terminated.

45. The method of communication for a facsimile apparatus according to claim 41 further comprising terminating communication when it is determined that the prescribed period of time has elapsed.

46. The method of communication for a facsimile apparatus according to claim 41, further comprising switching communication from the first mode communication to a second mode communication when it is determined that the prescribed period of time has elapsed.

47. The method of communication for a facsimile apparatus according to claim 46, wherein the first mode communication includes V.8 and V.34 mode communication, and the second mode communication includes V.21 mode communication.

48. The method of communication for a facsimile apparatus according to claim 46, wherein the second mode communication includes V.21 mode communication.

49. The method of communication for a facsimile apparatus according to claim 41 further comprising:
   storing information of a prescribed period of time waiting to receive a response signal for each signal in the first mode communication in a storage device; and
   selecting, each time a signal is detected, a corresponding period of time for the detected signal from the information stored in the storage device; and wherein
   the determining step determines if the selected period of time for the detected signal has elapsed.

50. The method of communication for a facsimile apparatus according to claim 49, further comprising selecting, when the selected period of time for the detected signal has elapsed, either an operational mode of the apparatus that switches communication from the first mode communication to a second mode communication, or that terminates communication, and controlling the operation of the apparatus as selected.

51. The method of communication for a facsimile apparatus according to claim 41, wherein the first mode communication includes V.8 and V.34 mode communication.

52. A facsimile apparatus, comprising:
   a modulation system;
   signal detect means for detecting a type of signal being transmitted or received by the modulation system;
   signal record memory means for storing information identifying a preceding type of detected transmitted or received signal;
   signal change determining means for comparing the type of detected transmitted or received signal with the stored information to determine if the type of detected transmitted or received signal differs from the preceding type of detected transmitted or received signal;
   time-out period designating means for designating an optimal time-out period for each type of signal in the first mode communication;
   timer start means for starting a timer each time the signal change determining means determines that the type of detected transmitted or received signal differs from the preceding type of detected transmitted or received signal;
   time-out determining means for determining if the optimal time-out period elapses after the timer is started; and
   after-error operation means for terminating communication of the apparatus after the optimal time-out period has elapsed.

* * * * *